(12) United States Patent
Hotz et al.

(10) Patent No.: US 7,987,575 B2
(45) Date of Patent: Aug. 2, 2011

(54) METHOD AND DEVICES FOR APPLYING FILMS TO INTERIOR WALL SECTIONS OF VEHICLE BODYWORK

(75) Inventors: Ernst Hotz, Schönau (DE); Josef Polak, Bodenheim (DE)

(73) Assignee: AKsys GmbH, Worms (DE)

( * ) Notice: Subject to any disclaimer, the term of this patent is extended or adjusted under 35 U.S.C. 154(b) by 1251 days.

(21) Appl. No.: 11/547,221

(22) PCT Filed: Mar. 22, 2005

(86) PCT No.: PCT/EP2005/003034
§ 371 (c)(1),
(2), (4) Date: Sep. 29, 2006

(87) PCT Pub. No.: WO2005/097587
PCT Pub. Date: Oct. 20, 2005

(65) Prior Publication Data
US 2008/0000070 A1    Jan. 3, 2008

(30) Foreign Application Priority Data
Apr. 1, 2004  (DE) .......................... 10 2004 015 978

(51) Int. Cl.
*B23P 11/00* (2006.01)
(52) U.S. Cl. ..................... 29/430; 29/701; 901/2; 901/6; 901/7; 901/8

(58) Field of Classification Search ..................... 29/431, 29/701, 26; 901/2, 6, 7, 8
See application file for complete search history.

(56) References Cited

U.S. PATENT DOCUMENTS
5,020,278 A * 6/1991 St. Angelo et al. .......... 49/490.1
5,216,800 A * 6/1993 Nishigori ........................ 29/712

FOREIGN PATENT DOCUMENTS
| DE | 199 27 105 A1 | 12/2000 |
| DE | 19927105 A1 * | 12/2000 |
| EP | 0 492 663 A1 | 7/1992 |
| EP | 0 675 035 A1 | 10/1995 |
| EP | 1 185 451 B1 | 5/2004 |

* cited by examiner

*Primary Examiner* — Derris H Banks
*Assistant Examiner* — Azm Parvez
(74) *Attorney, Agent, or Firm* — Fay Sharpe LLP

(57) ABSTRACT

The invention relates to a method and a device for applying films (10) to interior wall sections of the bodywork (7) of a vehicle with the aid of an instrument or robot (6) comprising a multi-membered articulated arm (18, 19) and gripping elements (21) for the films. To reduce the mounting time, the robot (6) is driven through an opening (14) in the interior of the bodywork (7), the films (10) to be applied are transported by transport elements (11) to the vicinity of the interior or into the interior of the bodywork (7) and the delivered films (10) are taken from the transport elements by the robot (6) and its gripping elements (21) and are applied to the respective interior wall sections.

12 Claims, 3 Drawing Sheets

METHOD AND DEVICES FOR APPLYING FILMS TO INTERIOR WALL SECTIONS OF VEHICLE BODYWORK

BACKGROUND

The invention concerns a method for applying films to interior wall sections of the bodywork of a vehicle during the course of assembly line production of the vehicle. In addition, the invention relates to a suitable device for execution of said method.

The use of films is known in the construction of vehicles in order to undertake acoustical measures and also for purposes of reinforcement. The acoustical measures include (body) sound-proofing, sound dissipation, sound isolation, sound absorption and sound reflection, etc. Films applied to larger sheet metal sections not only have sound deadening but also stabilizing or reinforcing effects.

The term "film" has acquired a particular meaning in the specialized trade language, independent of its purpose. It involves layer sections which, depending upon the effect to be achieved, may have the most diverse construction (single layer- or multi-layer systems made of different materials, frequently bitumen). The general term "film" is retained in the following.

Films of this kind are employed in many areas of a vehicle. Among them are interior surface sections of doors (two or four)
side walls (for example with two doors)
wheel cases, in particular wheel cases adjoining the passenger compartment
floor sheet metal pieces (for example two each in front and/or in the rear), also in the trunk
sheet metal walls between engine compartment and passenger compartment
interior side of the roof (overhead),
engine compartment Application of films on interior wall sections of vehicles may be impeded by other structures. This applies, for example, with respect to doors, which are as a rule constructed in two-sheet fashion. The side wall of a door case facing the passenger compartment is equipped with openings, through which must be passed the films to be applied to the inner surface of the outer side wall. This process is all the more difficult the smaller the openings in the inner side wall of the door casing or the larger the films are, since the films have adhesive effect, either due to adhesive forces (layer of glue applied on the film) or due to magnetic forces (magnetic material arranged in the film, in particular in form of powders). Applications of films of this type are highly time consuming and their placement is not precise.

Deposition or application of films on interior wall sections of vehicles or vehicle components was originally done by hand. In modern assembly lines frequently ten or more persons were busy applying various respectively delivered films to the designated interior wall sections. In this phase, the car body is still in its raw state, i.e. the car body components have been welded and their surface has been primed. So that the films will adhere up to their final fusion with the respective sheet metal section on vertical areas or in the case of overhead installation, they have, as already mentioned, adhesive properties. For that purpose, they can be equipped on one side with an adhesive layer. Another possibility consists in utilizing films comprising ferro-magnetic additions, which will temporarily adhere to the sheet metal sections based on magnetic forces. Following application of films performed in this manner on the pertinent interior wall sections of the raw bodywork, they are given a coat of lacquer.

As a rule, several coats of lacquer are applied. Subsequently, the car body is passed through an oven in which drying of the lacquer takes place. In addition, due to the thermal effect, final fusion of films with their respective wall section takes place. The thus attained full-surface positioning of the films on their respective base is a required pre-requisite so that the desired effect will definitely be achieved.

It is a drawback with respect to the described method of applying the films by hand on their pertinent sheet metal sections, since creation of dust and in particular of lint is unavoidable. These stick to the surface of the car body, which is subsequently given a coat of lacquer. Consequently the lint caught in the coats of lacquer results in uneven lacquer surfaces. They must be re-worked by grinding, by another coat of lacquer and by drying. In addition, the known method is relatively expensive based on high amount of manual labor.

In order to avoid the described drawbacks, utilization of a robot is known from DE-A1-199 27 105, i.e. an apparatus with a multi-member arm and a movably thereto attached gripping framework. With the aid of the gripping framework, one or several films are taken up outside the car body, after that the film or films together with the gripping framework is/are transported to the deposit site with the aid of the arm through an opening in the car body and deposited there.

Due to the fact that the application of the films is no longer done by hand, a significant source for the creation of dust or lint is eliminated. Time-consuming and costly re-work on the lacquer surfaces is done away with. In addition, placement of the films on the pertinent inner wall sections can take place with significantly greater precision, so that primarily the desired acoustical effect can be achieved more reliably. Finally, utilization of apparatuses executing placement of the films is more cost-effective over the long term.

With respect to the currently popular large dimensioned vehicles having a multitude of windows, frequently also several sliding roofs, and in case of trailers as well as residential trailers, there likewise exists the need to apply a multitude of differently large and individually cut or preformed films onto a corresponding multitude of interior wall sections of the respective vehicle. The gripping framework of the prior known robot must therefore be passed in and out of the car body, even if it can accept several films. This results on the one hand in relatively long installation times. And, on the other hand, the technical requirements with respect to the length and articulation of the rotor arms and the alignment possibilities of the gripping framework are high in order to reach from the outside all sites to be covered with film, in particular the places located relatively high on the interior side of the roof and overhead.

SUMMARY

The present invention is based on the object of reducing with respect to the methods and devices serving application of films on interior wall sections of a vehicle body, both installation times as well as technical expenditure.

A robot is located during application of the films in the interior of the vehicle body. The films to be positioned are transported up to the immediate vicinity—appropriately up to the interior of the vehicle body. This results in short installation times. In addition there is no longer any need for the robot to reach all locations to be covered with film from the outside. It can be designed much smaller and less complicated. The requirements in regard to its articulation are significantly lower.

Still further advantages of the present invention will be appreciated to those of ordinary skill in the art upon reading and understand the following detailed description.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF THE PREFERRED EMBODIMENTS

Figure 1:
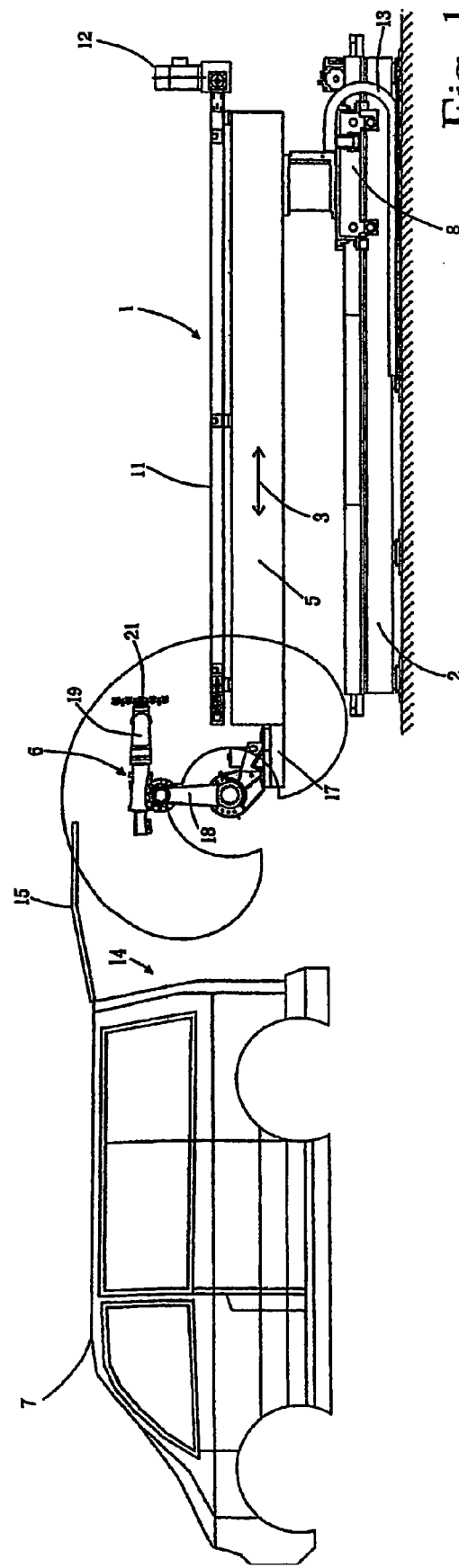
FIG. 1 shows a lateral view of the exemplary embodiment as well as the outline of a car body.

In the Figures, the invention-specific device is identified with 1, a basic element of longitudinally extended design with 2, a carriage identified with 5, likewise of longitudinally extended design, longitudinally displaceable (dual arrow 3) driven on tracks 4, the application robot with 6 and the car body to be equipped with films 10 (FIG. 3) with 7. The longitudinally slidably driven carriage 5 supports itself in the region of one of its two ends by means of a drive 8 conducted on tracks 4 on the basic element 2. The basic element 2 and the carriage 5 are arranged in equi-axed fashion, so that the carriage 5, in its retracted state (FIG. 1) is located above the basic element 2. Its end positioned opposite drive 8 carries the application robot 6. In addition, carriage 5 carries a transport means 11 with its drive motor 12. In connection with the description of FIG. 3, more detailed information will be provided. A towing chain is identified with 13, by means of which energy is provided and control of all structural components located on carriage 5.

The car body 7, which is to be equipped with films 10, during its assembly line transport, is being brought close to and aligned with the invention-specific device in such manner that the opening through which the robot 6 is to be driven into the interior of the car body 7 is facing the robot-equipped front side of the device 1. The represented case involves the opening 14 in the car body 7, which is created by lifting a rear flap 15.

Figure 2:
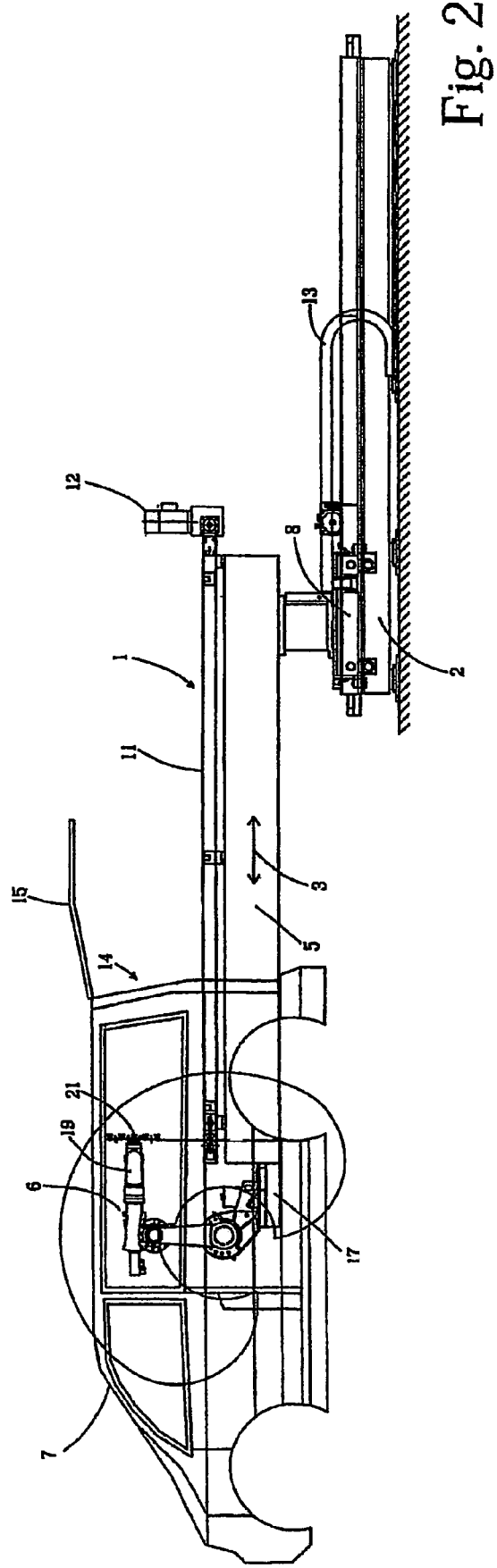
FIG. 2 shows a lateral view as in FIG. 1 with a robot driven into the interior of the raw car body and FIG. 3 shows a bird's eye view of the exemplary embodiment in its position represented in FIG. 2 (without raw car body).

The robot supports itself in revolvable fashion on a carrier 17 at the free front side of carriage 5 and comprises several articulated arms 18, 19, which support and move the only graphically indicated gripping unit 21. The dimensioning of the robot 6 and its components is selected in such manner that in its position of having entered the car body, (FIG. 2) it can reach with its gripper unit 21 all interior wall regions which have to be fitted with films. A possibly required displacement of the robot 6 in longitudinal direction of the car body in case of relatively long vehicles can be realized with the aid of carriage 5.

The carrier 17 of the robot 6 can be equipped with an appropriately in downward direction extendable support. Said support makes it possible for the robot 6 to support itself on the floor of the car body in its operating position after having entered the interior of the car body 7.

Figure 3:
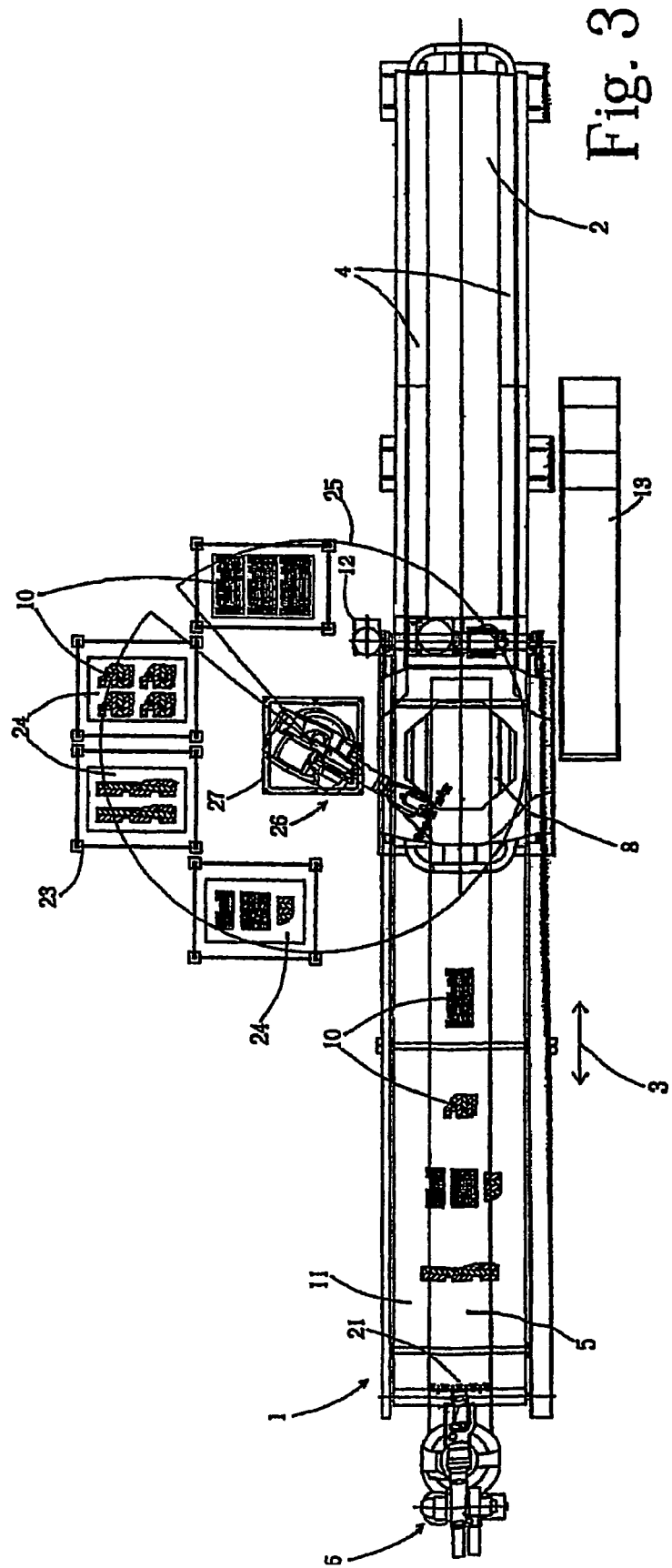

FIG. 3 reveals the type and manner of supplying the films 10 from an intermediate deposit 23 to the robot 6. The intermediate deposit 23 is located next to the basic component 2 and carriage 5, namely in the region of the end of the transport means 11, opposite the robot 6, if the robot is in its extended position. The intermediate deposit 23 comprises several—in the represented exemplary embodiment four—for example on pallets 24 arranged stacks of films 10 having different dimensions. They are arranged in the region of the periphery of a circular area 25, within which is also located the end of the transport means 11. In the center of said circular area 25 is located the loading robot 26, which supports itself in rotatable fashion on a basic element 27 and whose articulated arm is identified with 28. Its gripping elements are not shown in detail.

With the described arrangement of the intermediate deposit 23, the loading robot 26 is able to lift the films 10 in the sequence required by the application robot 6 from the film stacks and to deposit same on the transport means 11. The application robot 6 located within the car body 7 grips the films 10 individually one after the other or—if the gripping elements have the appropriate design—also several next to each other on transport means 11 deposited sets of films and applies them on the pertaining interior wall sections. A conveyor belt serves appropriately as transport means 11, onto which the films 10 could eventually also be deposited by hand. Utilization of the described loading robot 26 is however appropriate so that outfitting of car body 7 with films 10 can take place with accuracy and, completely automatically.

The described system is equipped with a programmable control, which is represented in FIG. 3 merely as block 31. To the extent necessary, by means of lines integrated into the towing chain, which are not shown in detail, the control 31 is in contact with the two robots 6, 26 and also with the drives 8 (carriage 5) and 12 (transport means 11) so that the described method operates in accordance with program specifications, which take into consideration, for example, the vehicle type and its model variation.

The figures depict the car body 7 of a large scale vehicle with opened rear flap 15. In this case the robot 6 is driven in direction of the longitudinal axis of the car body 7. Loading of the car body can also take place through other openings in the car body 7. Needless to say, the invention can also be employed with car bodies for vehicles of normal size, in particular station wagons. The engine compartment of a vehicle can also be fitted with films in accordance with the invention.

In regard to details concerning the employable gripping units of the robot, reference is made to the contents of the already cited DE-A1-199 27 105. In said document gripping structures are disclosed which are capable of picking up and depositing one or several films having the most diverse properties in regard to size, construction, form etc. Also disclosed in the mentioned document is the steering mechanism and/or the control of the installation method with the aid of a camera. With the present invention, these measures can also find application. The camera in this case is for example fastened on the articulated arm of robot 6 and sends its signals to the steering mechanism 31.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A device for applying films to inner wall sections of a vehicle body comprising:

an application apparatus or robot having a multi-member articulated arm and gripping elements arranged thereon for gripping the films and being driven completely through an opening into an interior of the vehicle body, the robot supporting itself in the area of a front side of a longitudinally displaceable carriage, and a transport device carried by the longitudinally displaceable carriage to transport the films to the robot from an intermediate deposit site for the films, the transport device extending into an operating position of the application robot when the application robot is inside the vehicle body.

2. The device according to claim 1, further including:

another robot at the intermediate deposit site, the another robot being configured to load the films for the application robot on the transport device.

3. The device according to claim 1, wherein:

the carriage supports itself on a base component in a longitudinally displaceable manner, and the carriage and base component are of extended design, and during an idle position the carriage and base component are disposed one above the other.

4. The device according to claim 1, wherein the transport device includes a conveyor belt.

5. The device according to claim 1, wherein the gripping elements of the robot are designed to pick up and deposit on an interior wall surface of the vehicle body each of several individual films of a set of films.

6. The device according to claim 1, wherein the robot supports itself on the carriage by a carrier, the carrier being equipped with a suitable support extendable in downward direction.

7. A device for applying films to interior wall sections of a vehicle body comprising:

an elongated base component;

an elongated carriage mounted with a longitudinal axis aligned with a longitudinal axis of the base component and mounted for translating movement along the longitudinal axis;

a carrier mounted adjacent one end of the carriage for vertical movement relative thereto;

a first robot mounted on the carrier, the first robot including gripping elements for gripping individual films to be applied to the interior wall sections of the vehicle body;

a second robot disposed adjacent the base component, the second robot including gripping elements for supplying individual films to the gripping elements of the first robot.

8. The device according to claim 1, wherein the films include self-adhering sheets which the application robot adheres as a layer on an interior surface area in the interior door or body panel of the vehicle body.

9. The device according to claim 1, wherein the carriage moves the application robot between the operating position inside the vehicle body and an idle position outside the vehicle body.

10. The device according to claim 7, wherein the first robot is configured to apply one or more of the individual films in at least one layer on interior wall surfaces of the interior wall sections of the vehicle body.

11. The device according to claim 7, further including:

a conveyer which is supported by and moves along the carriage to carry the individual films from the second robot to the first robot.

12. The device according to claim 11, wherein the carrier translates in one direction to move the first robot into the vehicle body and in an opposite direction to withdraw the first robot from the vehicle.

* * * * *